(12) United States Patent
Endo

(10) Patent No.: US 6,839,201 B2
(45) Date of Patent: Jan. 4, 2005

(54) SMALL MAGNETIC DISK CARTRIDGE

(75) Inventor: Yasushi Endo, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 66 days.

(21) Appl. No.: 10/310,182

(22) Filed: Dec. 5, 2002

(65) Prior Publication Data

US 2003/0107841 A1 Jun. 12, 2003

(30) Foreign Application Priority Data

Dec. 6, 2001 (JP) .................................... 2001-372702

(51) Int. Cl.⁷ ............................................ G11B 23/033
(52) U.S. Cl. ..................................................... 360/133
(58) Field of Search ........................................... 360/133

(56) References Cited

U.S. PATENT DOCUMENTS 4,149,207 A * 4/1979 Porter et al. ................. 360/133
6,146,735 A * 11/2000 Viggiano ..................... 360/133

* cited by examiner

Primary Examiner—Robert S. Tupper
(74) Attorney, Agent, or Firm—Sughrue Mion, PLLC

(57) ABSTRACT

A small magnetic disk cartridge for use in a card disk drive to be loaded in electronic equipment. The magnetic disk cartridge comprises a housing, a disk-mounting hub rotatable within the housing by a spindle provided in the disk drive, and a flexible magnetic disk mounted at one point on the disk-mounting hub.

9 Claims, 2 Drawing Sheets

FIG.2
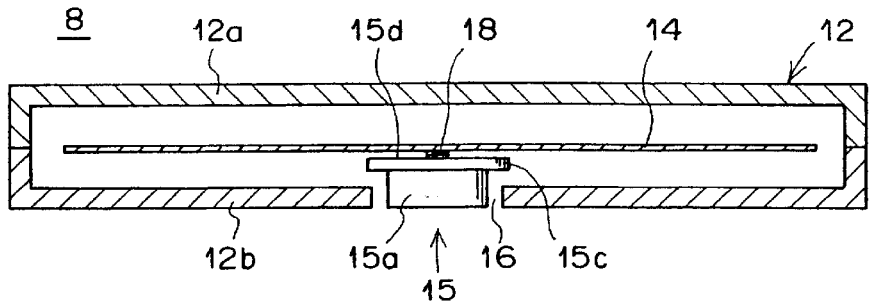
FIG.3
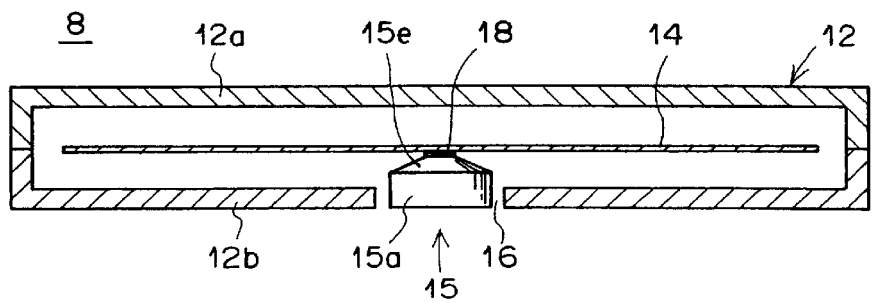
FIG.4
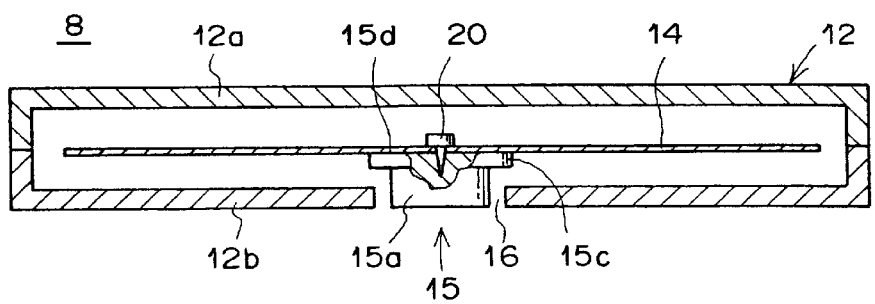
FIG.5 PRIOR ART

SMALL MAGNETIC DISK CARTRIDGE

BACKGROUND OF THE INVENTION

1. Field of the Invention

The present invention relates to a small magnetic disk cartridge, and particularly to a small magnetic disk cartridge that can be exchangeably loaded in a card disk drive that can be loaded in the card slot of electronic equipment such as a digital still camera, a digital video camera, a laptop personal computer, etc.

2. Description of the Related Art

To record or reproduce information, a wide variety of recording media are removably loaded in the card slot of electronic equipment such as a digital still camera, a digital video camera, a laptop personal computer (PC), etc. Such recording media that are in practical use are a semiconductor memory type, a hard disk type, an optical disk type, a magnetic disk type (e.g., a floppy disk type), etc.

Among these recording media, the semiconductor memory type is most widely used, because it is easy to handle and has a relatively large recording capacity. However, the semiconductor memory type is relatively expensive. Therefore, in digital cameras employing the semiconductor memory type, it is repeatedly used by storing the photographed image data in a PC, etc., and then deleting the data from the semiconductor memory.

Although there are known some hard disks that can store 340 megabytes (MB) of data or 1 gigabytes (GB) of data, the hard disk type of memory is similarly expensive. Because of this, the hard disk type is repeatedly used by storing data in a PC, etc.

The optical disk type has a large recording capacity for its size. For example, an optical disk with a size of 35 mm×41 mm×11 mm can store 256 MB of data. Optical disks with a recording capacity of 512 MB are about to be realized. However, optical disks have the disadvantage that the recording speed is slow, because the writing time is time-consuming.

Small magnetic disks (e.g., floppy disks) with a size of about 50 mm×55 mm×2 mm are known that can be exchangeably loaded in a disk drive of a size that can be inserted in the card slot of a PC, etc. However, the recording capacity is as small as 40 MB and insufficient to store data photographed by a camera. In addition, the size is not suitable for digital cameras.

With the spread of PCs, digital cameras have spread rapidly in recent years because of the easy method of recording, enhancement of the picture quality due to the development of imaging devices, the possibility of data deletion and transmission, size of the recording capacity, etc. However, digital cameras are restricted in use, because recording media are restricted in cost and recording capacity, as described above. For instance, since recording media are very expensive, one camera is usually provided with one recording medium, which is repeatedly used. That is, when the recording medium is filled with data, the data is transferred to a PC and deleted from the recording medium. Because of this, there are cases where the recording medium is filled up during a trip. In addition, the recording medium cannot be stored as it is, with data recorded therein, nor can it be given away to a person.

Hence, there is a demand for the realization of a small recording medium which is large in recording capacity and low in cost so that the data photographed by a digital camera can be stored as is, or given away to a person. In PCs, there is also a demand for the realization of an inexpensive small large-capacity recording medium that can be handed to a person.

To meet the aforementioned demands, it is contemplated that the above-described small recording medium may comprise a card disk drive which is loaded in electronic equipment such as a PC and a digital camera, and a magnetic disk cartridge which is loaded in the small card disk drive. That is, it is contemplated that such a magnetic disk cartridge may comprise a housing with a shutter, and a flexible magnetic disk, rotatably supported within the housing, which is capable of high-density recording and has a recording capacity of 200 MB or larger. Examples of magnetic recording media with a high recording density are a recording medium with a thin metal film formed by vapor deposition or sputtering, and a recording medium employing barium ferrite powder or ferromagnetic magnetic powder. An example of a magnetic recording medium with a high recording density employing barium ferrite powder is disclosed in U.S. patent application Ser. No. 10/266,584.

The "magnetic recording medium with a high recording density employing barium ferrite powder" is a magnetic disk containing barium ferrite powder in a magnetic layer, and is formed from a material that is capable of a high recording density. The magnetic disk may be constructed of a magnetic recording medium disclosed. The disclosed magnetic recording medium has a non-magnetic substrate, a non-magnetic layer which includes both non-magnetic powder and a binder, and a magnetic layer which includes both ferromagnetic powder (which is hexagonal-system ferrite powder) and a binder. The non-magnetic layer and the magnetic layer are formed on at least one surface of the non-magnetic substrate in the recited order. In the non-magnetic layer, the quantity of carbon black whose average particle diameter is 10 to 30 nm is 10 to 50 weight parts with respect to 100 weight parts of the aforementioned non-magnetic powder. The thickness of the magnetic layer is 0.2 $\mu$m or less. According to an electron-beam microanalysis, the standard deviation (b) of the strength of an element with respect to an average strength (a) which results from ferromagnetic powder is $0.03 \leq b/a \leq 0.4$. The center plane average roughness Ra of the magnetic layer is 5 nm or less, and the 10-point average roughness Rz is 40 nm or less. In a magnetic disk employing the above-described magnetic recording material, information is recorded or reproduced by employing a magnetic head, such as an MR head, a GMR head, or a TMR head, which is capable of a high recording density.

When the above-described magnetic recording medium is about 30 mm in diameter, it can have a high recording density of 200 MB or larger, preferably 500 MB or larger. Therefore, if a still image has about 1 MB of data per image, the magnetic recording medium can store 500 sheets. In the case of a motion picture, the magnetic recording medium can store image contents of about 30 minutes. Thus, the magnetic recording medium can store a motion picture photographed by a digital camera, or a motion picture transmitted by a portable telephone. As a result, users can conveniently use the magnetic recording medium. Furthermore, the magnetic recording medium can be conveniently used in PCs as an inexpensive large-capacity data storage medium. Thus, the convenience of the magnetic recording medium is great.

Note that card disk drives are loaded in electronic equipment such as a PC, a digital camera, etc. In the case of a PC shown in FIG. 1A, for instance, a card disk drive 6 is connected electrically with the socket 4 of the receiving portion of a card 2 that is inserted in the card slot of the PC. In the case of a digital camera 3 shown in FIG. 1B, a card disk drive 6 is connected electrically with the socket of the receiving portion 5 of the camera 3. A small magnetic disk cartridge 8 is removably loaded in these card disk drives 6.

Therefore, the above-described card disk drive 6 is extremely small in size and has, for example, a length of 38 to 55 mm, a width of 35 to 51 mm, and a thickness of 3 to 5 mm. The above-described magnetic disk cartridge 8 has, for example, a length and a width of 25 to 36 mm and a thickness of 1 to 3 mm. This magnetic disk cartridge 8 rotatably supports a flexible magnetic disk (indicated by a broken line in FIG. 1) within its housing.

With the advancement of a high recording density in magnetic disks, incidentally, the degradation of recording-reproduction characteristics due to a fluctuation in the spacing between a magnetic disk and a magnetic head, slight circumferential shift of narrowed data tracks, etc., have become problems.

A conventional small magnetic disk cartridge has, for instance, a structure such as that shown in FIG. 5. In this structure, a flexible magnetic disk 14 is rotatably supported within a flat housing 12. The housing 12 is constructed of an upper shell 12a and a lower shell 12b. The center portion of the magnetic disk 12 is mounted on a disk-mounting hub 15, which is spun by a spindle provided in the above-described disk drive 6. The lower shell 12 is provided with a spindle hole 16 through which the disk-mounting hub 15 is magnetically chucked by the above-described spindle. Note in all drawings that the dimensions, such as thickness, etc., of each part are shown at ratios differing from those of the actual dimensions to facilitate the understanding of the structure.

In FIG. 5, the disk-mounting hub 15 has a lower shaft portion 15a, an intermediate flange portion 15c, and an upper shaft portion 15b. The lower shaft portion 15a is magnetically chucked by the spindle provided in the disk drive 6. The upper shaft portion 15b is inserted in the center hole of the magnetic disk 14. The inner circumferential portion of the magnetic disk 14 around the center hole of the disk 14 is mounted on the annular top face 15d of the flange portion 15c.

However, in the case where the magnetic disk 14 is mounted on the flange portion 15c of the disk-mounting hub 15, wrinkles and distortions tend to occur around the inner circumferential portion of the magnetic disk 14 mounted on the flange portion 15c of the disk-mounting hub 15.

On the other hand, a reduction in the size of the magnetic disk 14 shortens the radial distance between the disk-mounting hub 15 and the innermost circumference of the recording area of the magnetic disk 14. Therefore, in a structure such as the one shown in FIG. 5, wrinkles and distortions produced in the magnetic disk 14 have a bad effect on the inner circumference of the recording area. If surface runout occurs during rotation, the touch of a magnetic head with the magnetic disk 14 will become unstable, and consequently, recording-reproduction characteristics will be greatly affected.

SUMMARY OF THE INVENTION

The present invention has been made in view of the above-described circumstances. Accordingly, it is the primary object of the present invention to provide a small magnetic disk cartridge which is loaded in a card disk drive for electronic equipment, thin in thickness, and large in recording capacity, and which has stable rotation, a good head touch, and excellent recording-reproduction characteristics by preventing surface runout.

To achieve this end and in accordance with the present invention, there is provided a small magnetic disk cartridge for use in a card disk drive to be loaded in electronic equipment. The magnetic disk cartridge comprises a housing, a disk-mounting hub rotatable within the housing by a spindle provided in the disk drive, and a flexible magnetic disk mounted at one point of the center thereof on the disk-mounting hub.

In a preferred embodiment of the present invention, the diameter of the one mounting point on the disk-mounting hub is 20% or less of the diameter of that portion of the disk-mounting hub which faces the magnetic disk, preferably 10% or less, and more preferably 5% or less. When the diameter of that portion of the disk-mounting hub which faces the magnetic disk is, for example, 10 mm, the diameter of the one point on the disk-mounting hub is 2 mm or less, preferably 1 mm or less, and more preferably 0.5 mm or less.

In the small magnetic disk cartridge of the present invention, the aforementioned flexible magnetic disk may be mounted at one point on the disk-mounting hub by an adhesive agent. The flexible magnetic disk may also be mechanically mounted at one point on the disk-mounting hub by a pin.

According to the magnetic disk cartridge of the present invention constructed as described above, the small area of the center portion of the magnetic disk is mounted at one point on the disk-mounting hub. Therefore, wrinkles and distortions are less liable to occur around the center portion of the magnetic disk. As a result, the flatness of the magnetic disk can be maintained during rotation, and a magnetic head can touch the magnetic disk stably.

According to the magnetic disk cartridge of the present invention, the dimensional accuracy of the assembly of the disk drive and the dimensional accuracy of the assembly of the magnetic disk cartridge can be absorbed. Furthermore, the operation of mounting the magnetic disk on the disk-mounting hub is easier than the above-described conventional operation of annularly mounting the magnetic disk cartridge on the disk-mounting hub.

BRIEF DESCRIPTION OF THE DRAWINGS

The present invention will be described in further detail with reference to the accompanying drawings wherein:

FIG. 2 is a schematic sectional view showing a small magnetic disk cartridge constructed in accordance with a first embodiment of the present invention;

FIG. 3 is a schematic sectional view showing a small magnetic disk cartridge constructed in accordance with a second embodiment of the present invention;

FIG. 4 is a schematic sectional view showing a small magnetic disk cartridge constructed in accordance with a third embodiment of the present invention; and FIG. 5 is a schematic sectional view showing a conventional magnetic disk cartridge.

DESCRIPTION OF THE PREFERRED EMBODIMENTS

Figure 1A:
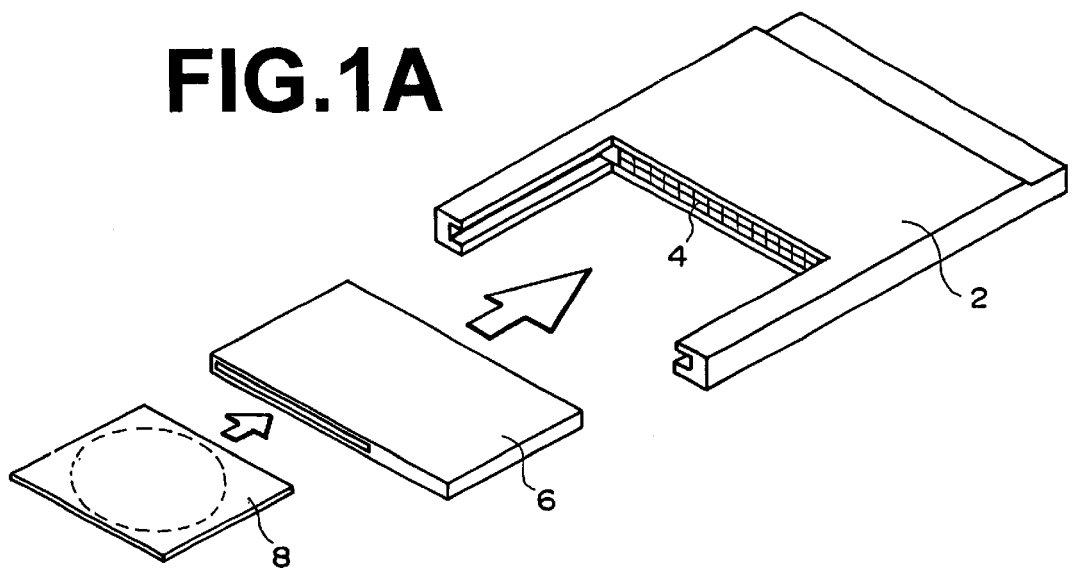
FIGS. 1A and 1B are diagrams used to explain how a magnetic disk cartridge is loaded in electronic equipment.
Figure 1B:
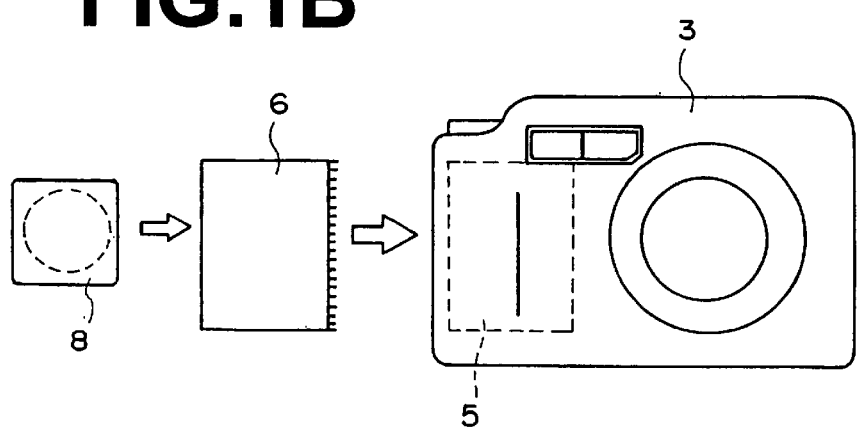

Referring now to FIG. 2, there is shown a small magnetic disk cartridge 8 constructed in accordance with a first embodiment of the present invention. The magnetic disk cartridge 8 has a flat housing 12 in which a magnetic disk 14 is rotatably supported. This magnetic disk 14 has no center hole and is constructed of a material that has a recording capacity of 200 MB or larger. For example, the magnetic disk 14 is constructed of the above-described magnetic recording medium that has a magnetic layer with a high recording density containing barium ferrite powder.

A disk-mounting hub 15 has a shaft portion 15a which is magnetically chucked by the spindle of the above-described disk drive 6, and a flange portion 15c which has a flat top face 15a. The lower shell 12b of the housing 12 has a spindle hole 16 to expose the disk-mounting hub 15. The center portion of the under side of the magnetic disk 14 is mounted at one point on the top face 15d of the disk-mounting hub 15 by an adhesive agent 18. The diameter of the one mounting point on the top face 15d of the disk-mounting hub 15 is 20% or less of the diameter of the flange portion 15c of the disk-mounting hub 15, preferably 10% or less, and more preferably 5% or less. When the diameter of the flange portion 15c of the disk-mounting hub 15 is, for instance, 10 mm, the diameter of the one point on the top face 15d of the disk-mounting hub 15 is 2 mm or less, preferably 1 mm or less, and more preferably 0.5 mm or less.

Referring now to FIG. 3, there is shown a small magnetic disk cartridge 8 constructed in accordance with a second embodiment of the present invention. Note in FIG. 3 that the same parts as the first embodiment of FIG. 2 are represented by the same reference numerals. The second embodiment is characterized in that the upper portion of a disk-mounting hub 15 is formed into a truncated cone 15e instead of the above-described flange portion 15c. The center portion of the under side of the magnetic disk 14 is mounted at one point on the top face of the truncated cone 15e by an adhesive agent 18.

Referring now to FIG. 4, there is shown a small magnetic disk cartridge 8 constructed in accordance with a third embodiment of the present invention. Note in FIG. 4 that the same parts as the first embodiment of FIG. 2 are represented by the same reference numerals. The third embodiment is nearly the same as the first embodiment of FIG. 2, but differs in that the center portion of a magnetic disk 14 is mounted mechanically at one point on the top face 15d of the flange portion 15c of a disk-mounting hub 15 by a pin 20 press-fitted in the flange top face 15d. In addition to the pin 20, the third embodiment may employ the adhesive agent 18 shown in FIG. 2.

As set forth above, the magnetic disk cartridge 8 of the present invention has the following advantages:

(1) The small area of the center portion of the magnetic disk 14 is mounted at one point on the disk-mounting hub 15. Therefore, wrinkles and distortions are less liable to occur around the center portion of the magnetic disk 14. As a result, the flatness of the magnetic disk 14 is maintained during rotation, and a stable head touch can be assured. (2) In the case where the magnetic disk 14 is mounted on the top face of the truncated cone 15e of the disk-mounting hub 15, as in the second embodiment shown in FIG. 3, a recess in which the flexible magnetic disk 14 can move downward is present between the flexible magnetic disk 14 and the truncated cone 15e. This recess can absorb the dimensional accuracy of the assembly of the disk drive 6 and the dimensional accuracy of the assembly of the magnetic disk cartridge 8. (3) The operation of mounting the magnetic disk 14 on the disk-mounting hub 15 is easier than the conventional operation of annularly mounting the magnetic disk cartridge 8' on the disk-mounting hub 15, shown in FIG. 5.

While the present invention has been described with reference to the preferred embodiments thereof, the invention is not to be limited to the details given herein, but may be modified within the scope of the invention hereinafter claimed.

What is claimed is:

1. A magnetic disk cartridge for use in a card disk drive to be loaded in electronic equipment, comprising:
   a housing;
   a disk-mounting hub rotatable within said housing by a spindle provided in said disk drive; and
   a flexible magnetic disk mounted at one point on said disk-mounting hub so that a center portion of the disk is fixed to the center portion of the hub at the one point.

2. The magnetic disk cartridge as set forth in claim 1, wherein the diameter of said one point on said disk-mounting hub is 20% or less of the diameter of a portion of said disk-mounting hub which faces said magnetic disk.

3. The magnetic disk cartridge as set forth in claim 2, wherein said flexible magnetic disk is mounted at the one point on said disk-mounting hub by an adhesive agent.

4. The magnetic disk cartridge as set forth in claim 1, wherein said flexible magnetic disk is mechanically mounted at the one point on said disk-mounting hub by a pin.

5. The magnetic disk cartridge as set forth in claim 1, wherein the diameter of the area where the disk is fixed to the hub is 10% or less of the diameter of the portion of the hub which faces the flexible magnetic disk.

6. The magnetic disk cartridge as set forth in claim 5, wherein said flexible magnetic disk is mounted at the one point on said disk-mounting hub by an adhesive agent.

7. The magnetic disk cartridge as set forth in claim 1, wherein the diameter of the area where the disk is fixed to the hub is 5% or less of the diameter of the portion of the hub which faces the flexible magnetic disk.

8. The magnetic disk cartridge as set forth in claim 7, wherein said flexible magnetic disk is mounted at the one point on said disk-mounting hub by an adhesive agent.

9. The magnetic disk cartridge as set forth in claim 1, further comprising a length of 25 to 36 mm, a width of 25 to 36 mm, and a thickness of 1 to 3 mm.

* * * * *